Feb. 17, 1970          N. B. MITCHELL, JR                3,495,371
                PREFABRICATED CONCRETE STRUCTURE
Filed June 11, 1969                                5 Sheets-Sheet 1
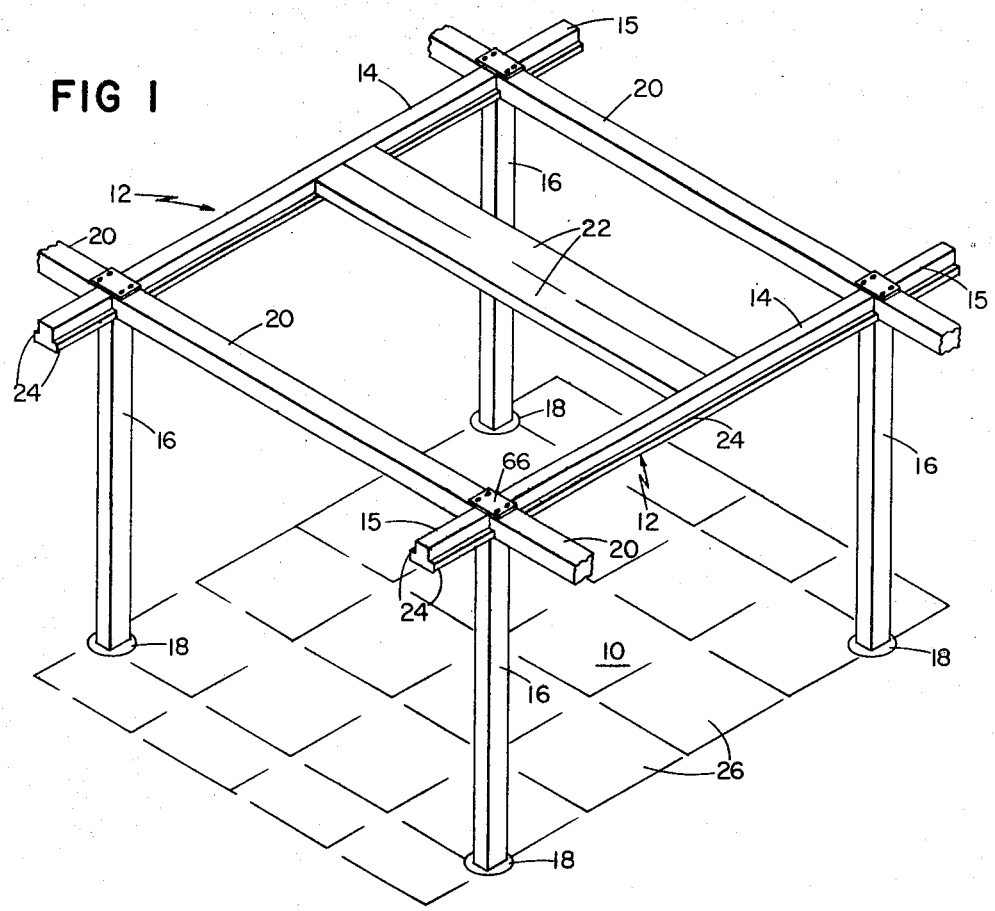
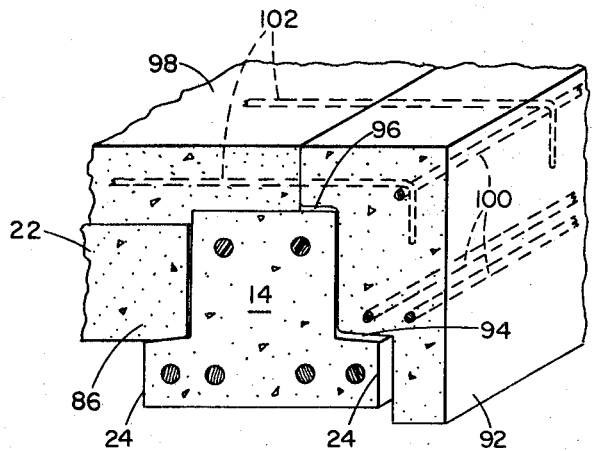

Feb. 17, 1970    N. B. MITCHELL, JR    3,495,371
PREFABRICATED CONCRETE STRUCTURE
Filed June 11, 1969    5 Sheets-Sheet 2
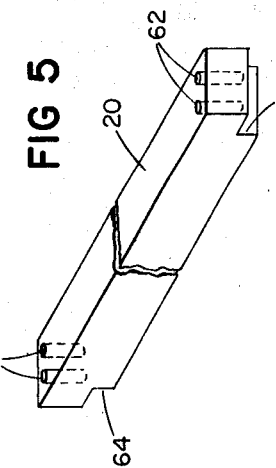
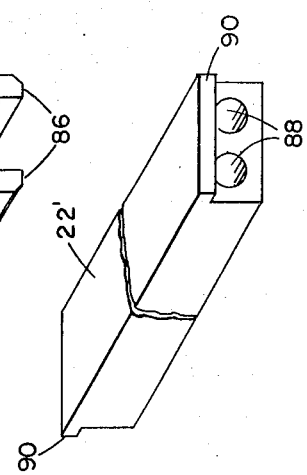
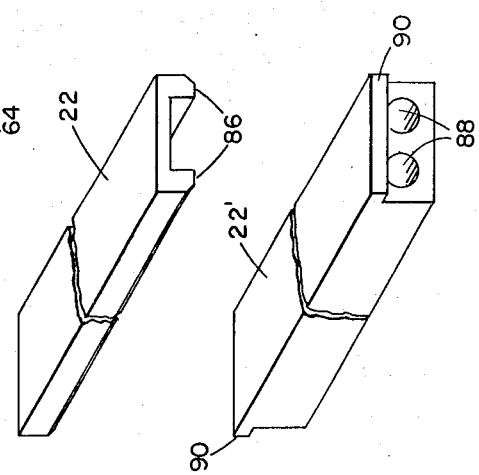
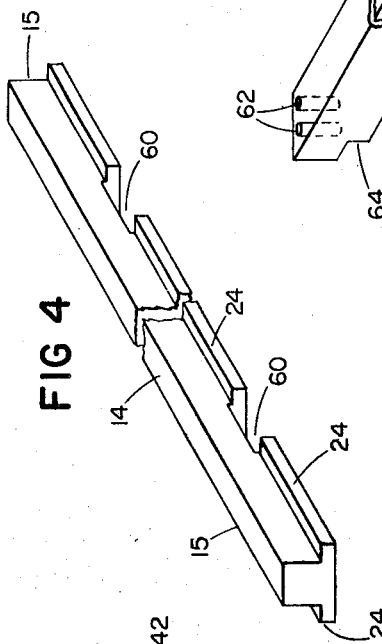
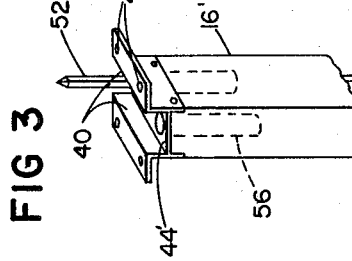
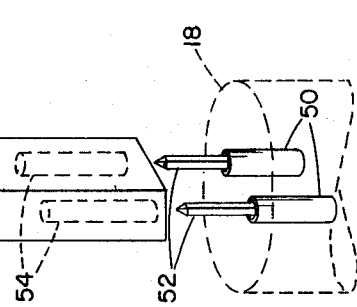
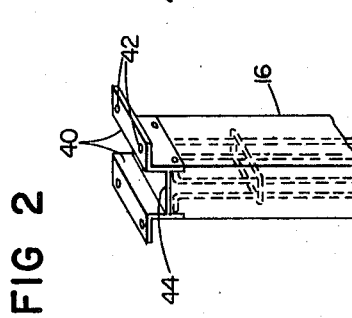
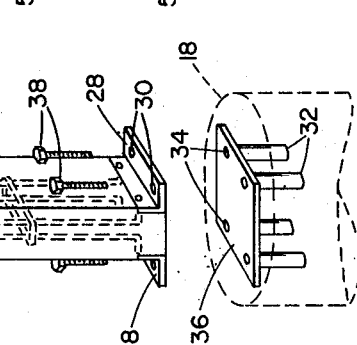

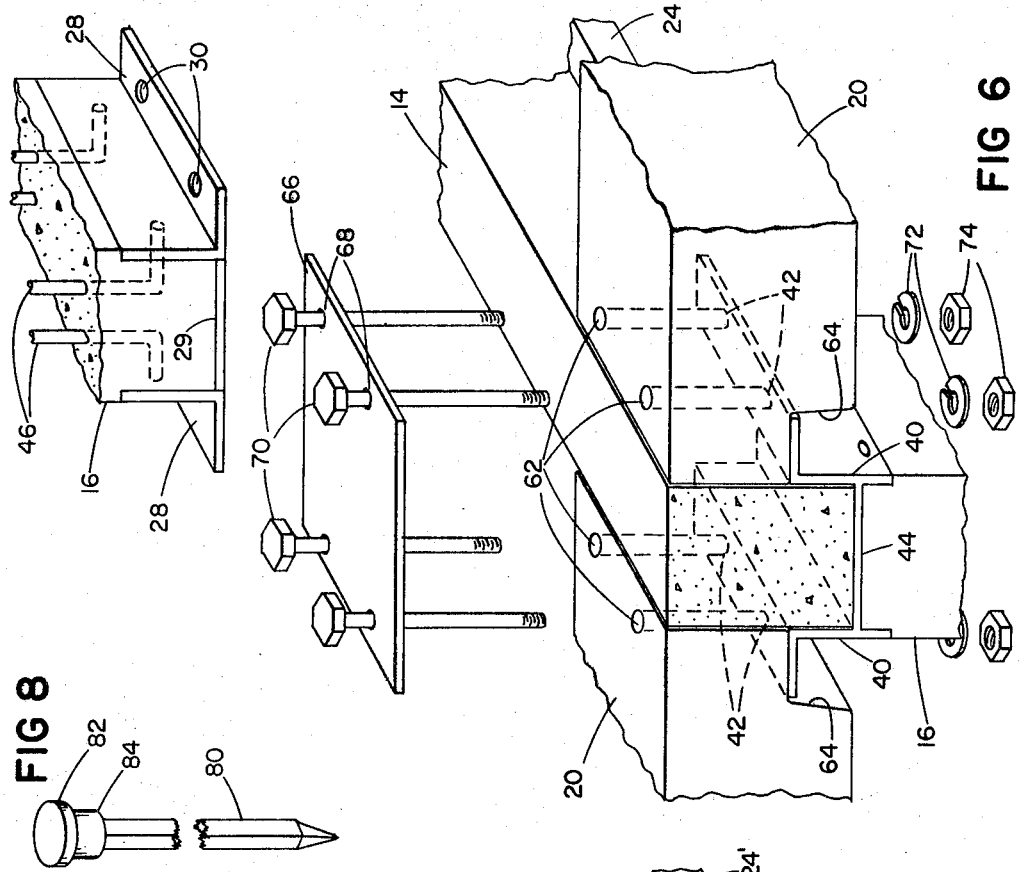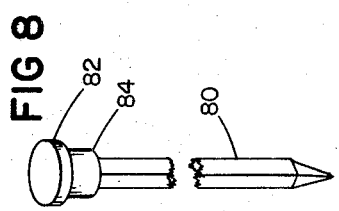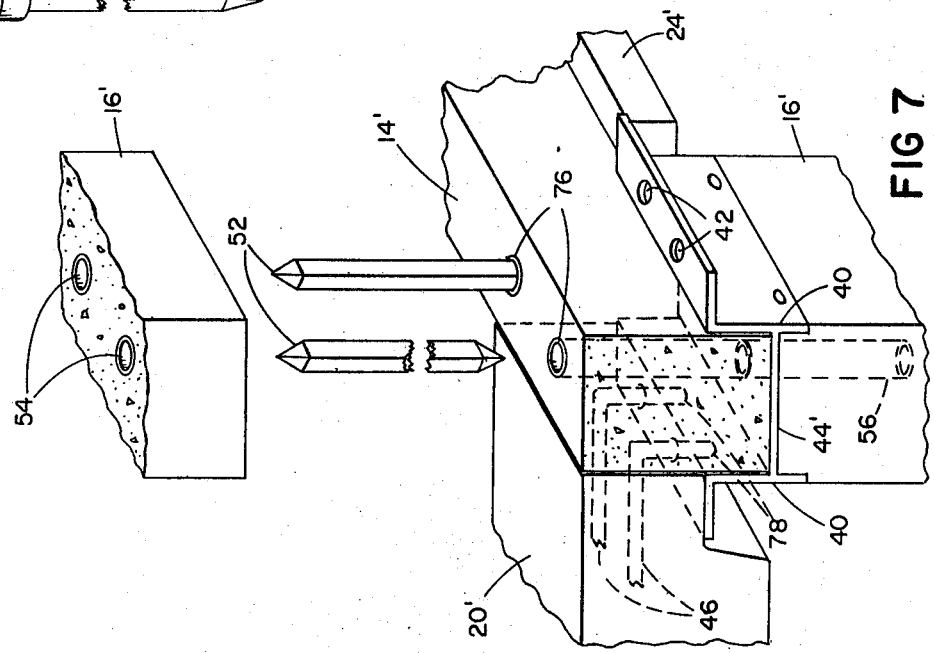

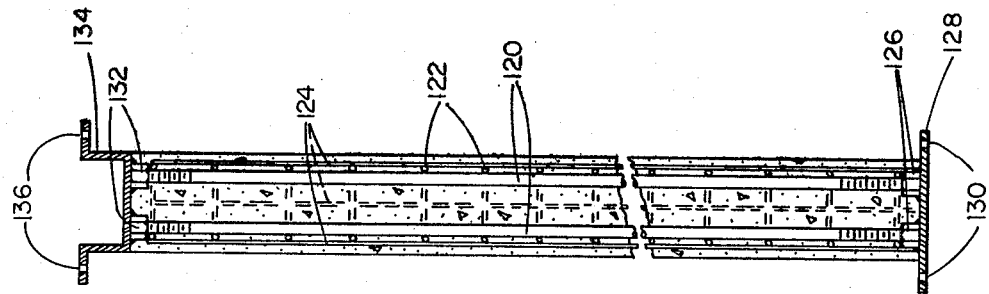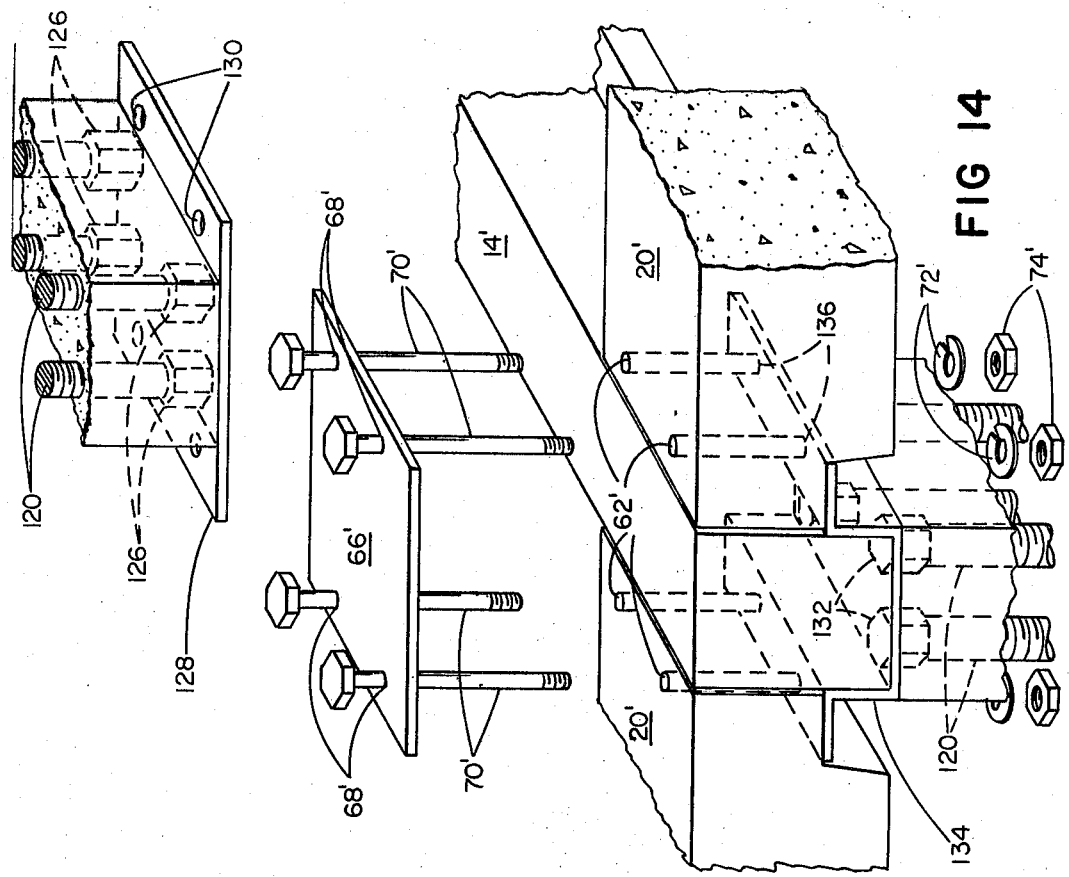

United States Patent Office 3,495,371
Patented Feb. 17, 1970

3,495,371
PREFABRICATED CONCRETE STRUCTURE
Neal B. Mitchell, Jr., 12 Stimson Ave.,
Lexington, Mass. 02173
Continuation-in-part of application Ser. No. 651,024,
July 3, 1967. This application June 11, 1969, Ser.
No. 832,208
Int. Cl. E04h 12/22; E04b 1/18
U.S. Cl. 52—648          5 Claims

ABSTRACT OF THE DISCLOSURE

Prefabricated concrete frame forming structure for a building unit including column members for vertical erection, the column members being provided at one end with fastening media for interlocking engagement with cooperating fastening media of a supporting structure and being provided at the other end with securing means for forming a moment transfer joint between the end of the column and a portion of a beam resting thereon. A modular spatial unit may be constructed using two such frames erected with their beams in spaced juxtaposition to each other, having cross members extending between them, and a structural system may be erected using the modular unit which is capable of horizontal and vertical expansion.

---

This invention is a continuation-in-part of my copending application Ser. No. 651,024, filed July 3, 1967, now abandoned.

This invention relates to prefabricated concrete structure, and more particularly to modular systems using such structures.

Conventional prefabricated concrete structures suitable for human occupation are formed typically of large heavy members and are costly, cumbersome and complex, requiring a substantial number of costly skilled laborers and expensive machines for erection and connection, and the time and cost involved in erecting the structure and setting the foundations for such structures is substantial. The types of forces and the location of moments require large members, which in turn require substantial footings and foundations. Typical prefabricated unit designs do not contemplate ease of expansion either horizontally or vertically; the walls may be solid concrete with no means to connect with an additional room, and often must be solid concrete for they must support as well as enclose.

Accordingly, it is a primary object of this invention to provide a prefabricated concrete frame which uses inexpensive members preferably of cellular concrete or other light weight mixes that support the load by both moment and shear transfer at the joint which frame may be erected and connected quickly, simply, and inexpensively without machines by unskilled men, and requires only small footings, because of the reduction in weight of the structural frame.

It is a further object of the invention to provide a modular structural system having a one room basic unit utilizing such a frame and capable of expansion in either horizontal direction and in the vertical direction, in which the walls carry no load and may even be eliminated without interfering with structural integrity, and the overall structural strength of the system increases as units are added in that the columns of many frames increase the lateral rigidity and the multi-story column has the single story bending stresses counteracted by additional story weight.

The invention features a prefabricated concrete frame forming structure for a building unit including column members for vertical erection and tie beams, the column members being provided at one end with axially extending fastening media for interlocking engagement with cooperating fastening media of a supporting structure and being provided at the other end with securing means for forming a moment transfer joint between the end of the column and a portion of a beam resting thereon. A modular spatial unit may be constructed using two such frames each formed of two columns and a beam erected with their beams in spaced juxtaposition to each other, having cross tie beam members extending between them, and such structural units may be combined horizontally and vertically to form a unitary structural system.

Other objects, features, and advantages will appear from the description of an embodiment of the invention, taken together with the attached drawing thereof, in which:

FIG. 1 is a perspective view of a modular unit using two frames mounted to footings according to the invention and connected by tie beams;

FIG. 2 is a broken, perspective, exploded view of a column and securing elements;

FIG. 3 is a perspective, exploded view of a modification of a column and securing elements, with parts broken away;

FIG. 4 is a broken, perspective view of a beam member constituting a part of the frame;

FIG. 5 is a broken, perspective view of a tie beam used to connect two frames to form a modular unit;

FIG. 6 is an exploded perspective view of a joint showing the relationship of a column, beam member, tie beams and securing elements of the type shown in FIG. 1;

FIG. 7 is a perspective view similar to FIG. 6 illustrating modified structure of the type shown in FIG. 2;

FIG. 8 is a perspective view of a modified securing element for use with the embodiment of FIG. 7;

FIG. 9 is a broken perspective view of a roof slab;

FIG. 10 is a broken perspective view of a modified roof slab;

FIG. 11 is a view partially in tranverse cross-section, partially in perspective, illustrating a beam member with roof slab, a fascia piece and a cover layer of concrete;

FIG. 13 is a perspective view, partially broken away and in section, of another modification of a column; and FIG. 14 is an exploded perspective view of a joint like that of FIG. 6 but utilizing the modified column of FIG. 13.

Figure 12:
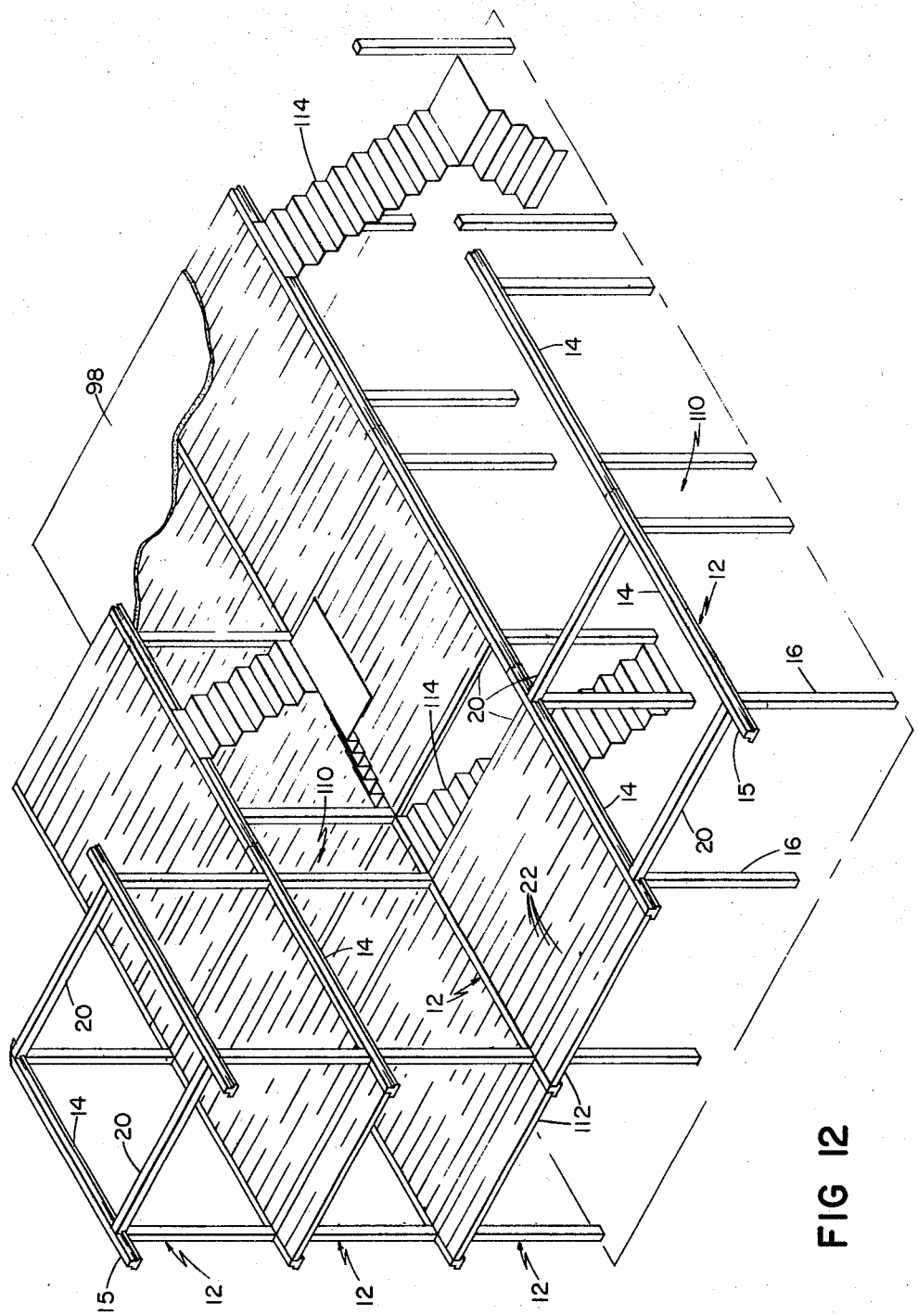
FIG. 12 is a perspective view partially broken away of a structural system using the modular units.

There is shown in FIG. 1 a modular unit 10 including two frames 12, each frame having a horizontal beam member 14 supported on two vertical members, columns 16. Columns 16 are mounted on footings 18 and frames 12 are interconnected by cross members, tie beams 20, and roof slabs 22, which rest on ledges 24 on members 14. Tie beams 20 are fastened at each end to the frames 12. A floor may be formed of cement filler blocks 26 as indicated, or of poured concrete. The column and beam members 16, 14 and tie beams 20 are fastened together into a unitized joint in which the beam members which carry the main load are held for moment transfer to the column members, by fastening media which in one form includes the anchor plate 66 and bolts as shown in FIG. 10 and hereinafter more fully described.

Various securing elements may be used to fasten columns 16 to concrete footings 18. In FIG. 2 the fastening members are two metal L-shaped members 28 located at opposite sides of the column, each having one leg cast to the base of the corresponding side of the column, the other leg forming a laterally projecting flange having therein bolt holes 30. The concrete footing 18, indicated by dotted lines, has embedded therein metal sockets 32 which open upwardly through openings 34 in a flat metal plate 36 to which they are attached. Plate 36 is cast horizontally to the top of footing 18 to receive thereon the base of a column 16 with apertures 30 aligned with apertures 34. Sockets 32 are screwthreaded internally to receive the threaded shanks of securing bolts 38 extended through holes 30.

Column 16 is provided at the top with a crotch, as shown formed by L-shaped members 40, similar to members 28, at each side, having portions of one leg thereof cast to a side of the column. Members 40 project above the end of column 16 to form between them the crotch in which is received for support a portion of a beam member, which may have an overhang portion 15 (FIG. 1). The other leg of members 40 is a laterally projecting horizontal flange having apertures 42 for receiving axially extending securing elements, as hereinafter described. Members 40 are optionally connected as shown by a flat plate 44 cast to the top of the column, and a like connecting plate between members 28 at the base is also optional.

Columns 16 are preferably provided interiorly with reinforcing, shown as longitudinal metal rods 46 which are preferably connected at intervals by transverse rods or strips 48 welded thereto to form a cage. The ends of rods 46 preferably are turned outwardly as shown and are butt-welded to the adjacent leg of the members 28 at the adjacent side of the column at its base and to members 40 or plate 44 at its top, to add strength and to facilitate moment transfer as well as to aid resistance to shear.

In FIG. 3 the modified securing elements for attaching column 16 to a footing comprise tubular metal members 50 embedded in footing 18 with their open tops flush with the top of the footing. Members 50 form sockets for receiving one end of spikes 52 which may be, as shown, of different cross sectional shape than members 50 to permit insertion of a grout filling between them. Spikes 52 are in turn received in socket members 54, like members 50 and embedded in the lower end of the column. While in this form of attachment it is preferred to provide sockets in both footing and column with spikes 52 provided separately for insertion of opposite ends in each set of sockets, optional variations include providing sockets in the footing and mating projections cast into the column or vice versa. So also in the FIG. 2 embodiment, bolts 38 may be cast in the footing with their threaded shanks projecting to be received through openings 30 in members 28 and fastened by nuts and washers.

A similar modified arrangement is shown at the top of column 16' of FIG. 3 for connecting the column to a beam member, comprising tubular socket members 56 embedded in the top thereof and opening through plate 44' to receive one end of a connecting spike 52, the other end of which is received in a corresponding socket in the beam. Socket members 54, 56 are preferably connected to reinforcing rods 46, as by transverse rods or strips (not shown) welded thereto. Also, these members 54, 56 need not be separate but may be the opposite ends of a pipe extending the full length of the column. Such a pipe may be filled with grout from the top after assembly.

In FIG. 6 there is shown components for forming a joint at the top of a column 16 of a frame 12 with the beam member 14 of that frame, the ends of two tie beams connecting that frame to two more frames, one at either side, and a second column to be erected on top of the foregoing assembly for vertical expansion if desired. As shown in FIG. 4, beam member 14 has its ledges 24 cut away to form notches 60 in which are received the upwardly projecting portions of members 40 of a column.

The laterally projecting flanges of members 40 form in effect continuations of ledges 24 and they receive in supporting relation thereon one end of the tie beams 20, which is provided therethrough with sockets 62, preferably metal tubes, which register with openings 42 in the flanges. The ends of tie beams 20 abut the sides of beam member 14 and are cut away at 64 (FIG. 5 and 6) to provide notches which receive the laterally projecting flanges of members 40, the notches being of such depth that the top of tie beams 20 is flush with the top of beam member 14.

In forming a joint of the type shown in FIG. 6, if it is not desired to extend the structure vertically, a flat plate 66 is provided having openings 68 therethrough, of a spacing to register with sockets 62, to receive therethrough the shanks of bolts 70. Bolts 70 are of a length to extend through registered openings 68, 62 and 42 and have threaded ends which project below the lateral flanges of members 40 for receiving lock washers 72 and nuts 74 to fasten the structure together. If the frame is to be extended vertically, plate 66 may be dispensed with and bolts 72 are extended through apertures 30 in the lateral projections of members 28 at the base of a second column 16. In this case plate 66 may be replaced by a plate 29 cast to the bottom of the upper column 16 and connecting members 28.

FIG. 7 shows in part a joint like that shown in FIG. 6 but using the alternate securing elements for column 16' shown in FIG. 3. In FIG. 7 the beam member 14' is provided in the portion overlying column 16' with socket members 76 extending therethrough in position to register with socket members 56 in the top of the column. Lugs projecting below the cut away ends of tie beams 20' and which may be ends of reinforcing rods 46 have threaded ends 78 adapted to extend through openings 42 in members 40 to receive washers 72 and nuts 74 to fasten the tie beams to the column. If a second column 16' is to be erected on top of a first one, spikes 52 have one end inserted through socket members 76 into sockets 56 where they may be secured by grout. Their upper ends are received in sockets 54 at the lower end of the upper column 16'.

If it is not desired to add another story to the structure, modified spikes 80 of FIG. 8 may be substituted for spikes 52, these having enlarged head portions 82 with flat tops. Heads 82 insure easy removal of spikes 80 and replacement with a spike 52 in case, at some future date, it is desired to super-impose another column for vertical expansion. Heads 82 may be provided with shoulders 84 to space the heads above a cover layer of poured concrete.

Particularly in cases in which no addition of another story is contemplated beam members 14 may have projecting bars or pipes corresponding to spikes 52 embedded therein in the proper locations to be received in sockets 56.

After four columns 16 have been erected and beams 14 and 20 have been joined thereto roofing or flooring cover slabs 22 are laid between beams 14 with their ends resting on ledges 24 of these beams. Slabs 22 may be in the form of a reinforced inverted channel having downwardly extending walls 86 for resting on ledges 24, FIG. 9, or they may be of the rectangular cross-section of slab 22' of FIG. 10, having hollow tubular passages 88 which may be used as air, steam or wiring ducts, and lips 90 which rest on ledges 24.

When a frame 12 has tie beams 20 and slabs 22 or 22' at one side only of beam members 14, as where it forms an external face of a unit 10 or group of such units, the other side of the beam members may, as shown in FIG. 11, be provided with fascia 92, having a shoulder 94 seating on ledge 24 and the lateral flanges of members 40 at the top of the columns. The fascia may be attached to the columns by bolts extending through apertures therein (not shown) and apertures 42 in said flanges. A second shoulder 96 on fascia 92 seats on top of beam member 14 and forms a side abutment for a poured layer of concrete 98 on top of slabs 22. The outer side of fascia 92 is shaped as desired to provide a finished facade. Preferably, as shown, fascia 92 is provided with reinforcing structure 100 similar to the reinforcing used in the columns and also with reinforcing rods 102 anchored to the internal reinforcing and projecting outwardly from shoulder 96 to be embedded in the poured layer of concrete, for attachment and reinforcing purposes.

While not shown in all drawings, it will be understood that beams 14 and 20 and slabs 22, 22' will normally be provided with internal reinforcing similar to that shown in the drawings for columns 16 and 16'. Any socket members are desirably attached to such reinforcing to facilitate the transfer of load forces.

A modular spatial unit 10 may be expanded into a structural system, FIG. 12, by adding one additional frame 12 in the direction transverse to beam member 14 and connecting that frame to one of the frames of the existing modular unit 10 to form another modular unit 10, the center frame 12 being shared by each of the adjacent modular units as in FIGS. 1 and 6.

Expansion in the direction parallel to beam members 14 is accomplished by erecting additional modular units 10 having their members 14 preferably abutting and colinear with member 14 of existing units 10 as shown in FIG. 12. Internal passageways 110 for halls and stairways and external projections 112 of roof or floor may be enlarged, reduced, or eliminated as necessitated by design or available land area merely by adjusting the length of overhangs 15, or by eliminating such overhang. Flights of stairs 114 to upper stories may be provided in passageways 110 or elsewhere as appropriate.

Vertical expansion increases the structural integrity of the system, for the increased weight of the added levels increases the compressive forces on the columns 16, counteracting the bending force on them caused by the moment transfer of the load through members 14. A continuous layer of concrete 98 overspreading all the roof or floor surfaces of all the modular units, at each level, acts as a diaphragm unitizing the structure and increasing its resistance to wind-shear forces.

It is preferred to use as the concrete of the frame forming members and slabs a lightweight concrete, of the order of 50 to 90 pounds per cubic foot. Such a concrete which is cellular, steam cured and has a strength of approximately 2,000 to 5,000 pounds or more per square inch has been found suitable and is preferred.

The modified column structure shown in FIGS. 13 and 14 has significant advantages over those previously described in that it permits more accurate alignment of the end plates at right angles to the column axis and it also provides a better all-metal core frame through which moment transfer can take place.

Referring to FIG. 13, a reinforcing metal core frame is provided which includes bolts 120 shown as four in number forming the four corners of a rectangular or square cross-section metal reinforcing cage, the remainder of which is formed of smaller gage transverse rods 122 surrounding and tied to bolts 120 and axially extending rods 124 tied to rods 122. Bolts 120 are screw threaded at both ends and one end thereof is threaded into correspondingly threaded nuts 126 which are welded to a flat metal column bottom plate 128, plate 128 having lateral flange extensions provided with apertures 130 for receiving fastening bolts as in the FIG. 2 embodiment. The other ends of bolts 120 are threaded into correspondingly threaded nuts 132, which are welded to the bottom of metal column top member 134 which is generally U-shaped forming a crotch for receiving a beam as in the FIG. 2 and FIG. 6 embodiment. Also, as on FIGS. 2 and 6, member 134 is provided with lateral projections at its upper end having apertures 136 for receiving attaching bolts for securing another column or top plate thereto.

The column of FIGS. 13 and 14 may be desirably formed by first welding nuts 132 to the bottom of top member 134 and threading one end of bolts 120 into nuts 132. Rods 122 are then arranged about and tied to bolts 120 and rods 124 are tied to rods 122 forming the cage. Nuts 126 are then threaded on the free ends of bolts 120 and plate 12 is placed against the bottom of nuts 126, the nuts being adjusted until plate 128 is in substantially exact parallel alignment with the mid portion of top member 134 and the nuts being then welded to plate 128. The cage with end plate and member attached is then placed in a mold and concrete is poured in the mold to complete the column as shown. In this way it is possible to obtain requisite alignment of bottom plate and top member within very close tolerances.

The column according to this figure may be mounted and secured on a concrete footing with fastening media as shown in FIG. 2 and described above, apertures 130 corresponding to bolt holes 30 in FIG. 2. As shown in FIG. 14, a top joint between a column, a beam resting in the crotch formed by member 134 and either the bottom plate 128 of a second column erected on top of the first one or a top plate and tie beams in the same manner as in the embodiment of FIG. 6, the top plate and other fastening media being the same as in FIG. 6 and being designated by primes of the same reference numerals.

Other embodiments will occur to those skilled in the art and are within the following claims:

What is claimed is:

1. Prefabricated frame forming structure for a building unit comprising:

four prefabricated concrete column members for vertical erection, said column members each being provided at the bottom end with means securing the same to a supporting structure and being provided at the top end with two plates secured to said column member and projecting axially beyond the top end thereof in opposed spaced relation forming the sides of a crotch at the top end of said column member, at least one of said plates being provided with a laterally extending flange;

a first pair of beam members each having longitudinally shaped portions shaped and sized to seat between said plates centrally within said crotches of said columns so that said columns may be erected with the ends of said crotches aligned and said portions of said beam members seated in said crotches to form two sides of a four-sided frame;

a second pair of beam members each having opposite end portions seating on said flanges to form the other two sides of said frame; and fastening media securing each of said end portions of said second pair of beam members to said flange members and for securing each of said first pair of beam members in said crotches so that said first pair of beam members forms moment transfer joints with the associated columns.

2. The frame forming structure of claim 1 wherein both of said plates are provided with said laterally extending flanges and said fastening media include a plate member to overlie a said portion of one of said first pair of beam members seated in a said crotch on the top of a said column member, said plate member having end portions extending beyond the sides of said crotch to overlie said flanges and being provided with openings therethrough, openings in said flanges registering with said openings in said end portions of said plate member, openings in said end portions of said second pair of beam members registering with said plate member and flange openings, and bolts for extension through said aligned openings.

3. The frame forming structure of claim 1 wherein said fastening media include tubular socket members in said top end of a said column member, openings through said portion of the one of said first pair of beam members seated in the crotch at the top of said column registering with said sockets and spikes for insertion through said openings into said sockets.

4. The frame forming structure of claim 1 which includes four additional column members each having the bottom end thereof adapted to seat on the top of a said portion of a said beam member seated in the crotch of one of said other four column members and each of said four additional column members having fastening media at the bottom end thereof for securing the same to the top ends of one of said first four column members.

5. The frame forming structure of claim 1 wherein said column members have end plates at the top and bottom ends extending substantially transversely to the column axis, said end plate at the top end connected between said two axially projecting plates, and bolts extending axially through said column and connected to said end plates, the connections of said bolts to at least one of said plates comprising mating screw threading on the bolt ends and in sockets on the end plate.

References Cited

UNITED STATES PATENTS

| | | | |
|---|---|---|---|
| 734,192 | 7/1903 | Randolph | 52—301 |
| 880,243 | 2/1908 | Rominger | 52—301 |
| 1,037,416 | 9/1912 | Beverstock | 52—703 |
| 1,060,853 | 5/1913 | Peirce | 52—723 |
| 1,321,213 | 11/1919 | Johnson | 52—321 |
| 2,724,261 | 11/1955 | Rensaa | 52—283 |
| 2,943,716 | 7/1960 | Babcock | 52—648 |
| 3,261,135 | 7/1966 | Knabe | 52—301 |

FOREIGN PATENTS

| | | |
|---|---|---|
| 605,964 | 8/1948 | Great Britain. |
| 751,847 | 7/1956 | Great Britain. |
| 467,791 | 8/1950 | Canada. |
| 1,283,969 | 1/1962 | France. |

FRANK L. ABBOTT, Primary Examiner

J. L. RIDGILL, Jr., Assistant Examiner

U.S. Cl. X.R.

52—236, 252, 301; 287—20.95